(12) United States Patent
Huang et al.

(10) Patent No.: US 8,045,336 B2
(45) Date of Patent: Oct. 25, 2011

(54) STORAGE DEVICE BACKPLANE AND IDENTIFICATION CIRCUIT

(75) Inventors: Lan Huang, Shanghai (CN); Shih-Hao Liu, Taipei (TW)

(73) Assignee: Inventec Corporation, Taipei (TW)

( * ) Notice: Subject to any disclaimer, the term of this patent is extended or adjusted under 35 U.S.C. 154(b) by 890 days.

(21) Appl. No.: 12/025,505

(22) Filed: Feb. 4, 2008

(65) Prior Publication Data

US 2009/0154088 A1    Jun. 18, 2009

(30) Foreign Application Priority Data

Dec. 14, 2007    (CN) .......................... 2007 1 0300993

(51) Int. Cl.
*H05K 1/11*    (2006.01)
*H05K 1/14*    (2006.01)

(52) U.S. Cl. .......................... 361/792; 361/729; 361/800

(58) Field of Classification Search .................. 361/788, 361/752, 790, 800, 759, 756, 727–730, 792, 361/796–797, 807, 810; 312/223.1, 223.2
See application file for complete search history.

(56) References Cited

U.S. PATENT DOCUMENTS 4,477,862 A * 10/1984 Gonzales ................. 361/679.32
5,793,998 A * 8/1998 Copeland et al. ............. 710/305
5,822,551 A * 10/1998 Crane et al. ................... 710/307
7,281,063 B2 * 10/2007 Benson et al. .................... 710/2

FOREIGN PATENT DOCUMENTS

TW    M277084    10/2005

* cited by examiner

*Primary Examiner* — Hung S Bui
(74) *Attorney, Agent, or Firm* — J.C. Patents

(57) ABSTRACT

A storage device backplane and an identification circuit for identifying using situations of the storage device backplane are provided. The storage device backplane possesses a first connection interface and a second connection interface, for being used as a first backplane supporting a motherboard, or a second backplane cascaded to the first backplane, or a first backplane supporting a daughterboard of the motherboard. The first and second backplanes possess the same storage device backplane structure. If the storage device backplane is used as the first backplane, a first connection interface of the first backplane is coupled to the motherboard or the daughterboard thereof; if the storage device backplane is used as the second backplane, a first connection interface of the second backplane is coupled to a second connection interface of the first backplane. The identification circuit identifies using situations of the storage device backplane and display corresponding correct indicator number.

9 Claims, 2 Drawing Sheets

STORAGE DEVICE BACKPLANE AND IDENTIFICATION CIRCUIT

CROSS-REFERENCE TO RELATED APPLICATION

This application claims the priority benefit of China application serial no. 200710300993.4, filed on Dec. 14, 2007. The entirety of the above-mentioned patent application is hereby incorporated by reference herein and made a part of this specification.

BACKGROUND OF THE INVENTION

1. Field of the Invention

The present invention generally relates to a storage device backplane, in particular, to a storage device backplane applicable for being used as different combinations.

2. Description of Related Art

During the production of storage device backplanes, they are generally designed according to customers' different requirements. Generally, the customers' requirements are different from one another. Some of the customers require one storage device backplane to support a hard disk of the motherboard, and some of them require two storage device backplanes, and even some other customer requires the storage device backplane to support a hard disk of a function circuit of the daughterboard. Other customers may require two storage device backplanes, one backplane supports first four hard disks of the motherboard, and the other one supports last two hard disks of the motherboard, etc. Therefore, all the manufacturers produce the backplanes with various functions depending upon various requirements.

Apparently, the manufacturers will produce excessive backplanes with similar functions. As for the manufacturers, due to producing backplanes with different structures, the resulted inventory cost and management cost will become rather high.

SUMMARY OF THE INVENTION

Accordingly, the present invention is directed to a storage device backplane, applicable for being used as a first backplane supporting a motherboard, or as a second backplane cascaded to the first backplane, or as a first backplane supporting a daughterboard of the motherboard, in which the first and second backplanes possess the same storage device backplane structure.

The present invention is further directed to an identification circuit, capable of identifying using situations of the storage device backplane and displaying a corresponding correct indicator number.

The present invention provides a storage device backplane, which possesses a first connection interface and a second connection interfaces and applicable for being used as a first backplane supporting a motherboard, or as a second backplane cascaded to the first backplane, or as a first backplane supporting a daughterboard of the motherboard. The first backplane and the second backplane possess the same storage device backplane structure. If the storage device backplane is used as the first backplane, a first connection interface of the first backplane is coupled to the motherboard or the daughterboard of the motherboard; if the storage device backplane is used as the second backplane, a first connection interface of the second backplane is coupled to a second connection interface of the first backplane.

In an embodiment of the storage device backplane, when the first connection interface of the first backplane is coupled to the motherboard, the first backplane receives a first control signal of the motherboard; when the first connection interface of the first backplane is coupled to the daughterboard, the first backplane receives a second control signal of the motherboard; and a logic level of the first control signal and a logic level of the second control signal are mutually inverted.

In an embodiment of the storage device backplane, when the first connection interface of the first backplane is coupled to the motherboard and the first connection interface of the second backplane is coupled to the second connection interface of the first backplane, the second backplane receives the first control signal; when the first connection interface of the first backplane is coupled to the daughterboard and the first connection of the second backplane is coupled to the second connection interface of the first backplane, the second backplane receives the second control signal.

In an embodiment of the storage device backplane, when the first connection interface of the first backplane is coupled to the motherboard, the first connection interface of the first backplane generates a corresponding first identification signal; if the cascaded second backplane exists, the first connection interface of the second backplane generates a corresponding second identification signal; and the first and second identification signals are used to identify whether the backplane is the first backplane directly connected to the motherboard, and to identify whether the backplane is the cascaded second backplane.

In an embodiment of the storage device backplane, the second connection interface of the first backplane generates a third identification signal; if the cascaded second backplane exists, the second connection interface of the second backplane generates a corresponding fourth identification signal; and the third and fourth identification signals are used to identify whether the first backplane is cascaded to the second backplane, and to identify whether the first backplane is an unique storage device backplane.

In an embodiment of the storage device backplane, the storage device backplane at least has the following three using situations: in a first using situations only one storage device backplane exists and is coupled to the motherboard, and the storage device backplane is used as the first backplane; in a second using situation, two storage device backplanes exist and support the daughterboard of the motherboard, one of the two storage device backplanes is used as the first backplane, the other one is used as the second backplane, the first backplane is coupled to the daughterboard, and the second backplane is cascaded to the first backplane; and in a third using situation, two storage device backplanes exist and support a south bridge controller of the motherboard, one of the two storage device backplanes is used as the first backplane, the other one is used as the second backplane, the first backplane is coupled to the motherboard, and the second backplane is cascaded to the first backplane.

In an embodiment of the storage device backplane, in the first using situation, the storage device backplane supports at most 5 hard disks.

In an embodiment of the storage device backplane, in the second using situation, the first and second backplanes are connected to PCI high-speed interfaces on the motherboard through the daughterboard, and the first backplane supports at most 4 or 8 hard disks, and the second backplane supports at most 4 or 8 hard disks.

In an embodiment of the storage device backplane, in the second using situation, the daughterboard has a function circuit, and the first and second backplanes are connected to the PCI high-speed interfaces on the motherboard through the function circuit.

In an embodiment of the storage device backplane, in the third using situation, the first and second backplanes are controlled by the south bridge controller of the motherboard, and the first backplane supports at most 4 hard disks, and the second backplane supports at most 2 hard disks.

The present invention further provides an identification circuit, coupled to a storage device backplane, in which at least one storage device backplane exists and possesses a first connection interface and a second connection interface, which is applicable for being used as a first backplane supporting a motherboard, or as a second backplane cascaded to the first backplane, or as a first backplane supporting a daughterboard of the motherboard. The first backplane and the second backplane possess the same storage device backplane structure. If the storage device backplane is used as the first backplane, a first connection interface of the first backplane is coupled to the motherboard or the daughterboard of the motherboard; if the storage device backplane is used as the second backplane, a first connection interface of the second backplane is coupled to a second connection interface of the first backplane, and the identification circuit identifies the using situation of the storage device backplane according to a signal change on the storage device backplane.

In an embodiment of the identification circuit, when the first connection interface of the first backplane is coupled to the motherboard, the first backplane receives a first control signal of the motherboard; when the first connection interface of the first backplane is coupled to the daughterboard, the first backplane receives a second control signal of the motherboard; a logic level of the first control signal and a logic level of the second control signal are mutually inverted; and the identification circuit identifies whether the first backplane is directly connected to the motherboard or not according to the first and second control signals.

In an embodiment of the identification circuit, when the first connection interface of the first backplane is coupled to the motherboard, the first connection interface of the first backplane generates a corresponding first identification signal; if the cascaded second backplane exists, the first connection interface of the second backplane generates a corresponding second identification signal; and the identification circuit identifies whether the backplane is the first backplane directly connected to the motherboard or not, and identifies whether the backplane is the cascaded second backplane or not according to the first and second identification signals.

In an embodiment of the identification circuit, the second connection interface of the first backplane generates a third identification signal; if the cascaded second backplane exists, the second connection interface of the second backplane generates a corresponding fourth identification signal; and the identification circuit identifies whether the first backplane is cascaded to the second backplane or not, and identifies whether the first backplane is an unique storage device backplane or not according to the third and fourth identification signals.

In an embodiment of the identification circuit, the identification circuit identifies that the storage device backplane at least has the following three using situations: in a first using situation, only one storage device backplane exists and is coupled to the motherboard, and the storage device backplane is used as the first backplane; in a second using situation, two storage device backplanes exist and support the daughterboard of the motherboard, one of the two storage device backplanes is used as the first backplane, the other one is used as the second backplane, the first backplane is coupled to the daughterboard, and the second backplane is cascaded to the first backplane; and in a third using situation, two storage device backplanes exist and support a south bridge controller of the motherboard, one of the two storage device backplanes is used as the first backplane, the other one is used as the second backplane, the first backplane is coupled to the motherboard, and the second backplane is cascaded to the first backplane.

In an embodiment of the identification circuit, in the first using situation, the storage device backplane supports at most 5 hard disks.

In an embodiment of the identification circuit, in the second using situation, the first and second backplanes are connected to PCI high-speed interfaces on the motherboard through the daughterboard, the first backplane supports at most 4 or 8 hard disks, and second backplane supports at most 4 or 8 hard disks.

In an embodiment of the identification circuit, in the second using situation, the daughterboard has a function circuit, and the first and second backplanes are connected to the PCI high-speed interfaces on the motherboard through the function circuit.

In an embodiment of the identification circuit, in the third using situation, the first and second backplanes are controlled by the south bridge controller of the motherboard, the first backplane supports at most 4 hard disks, and the second backplane supports at most 2 hard disks.

In an embodiment of the identification circuit, the identification circuit further includes an LED drive circuit, and through using the LED drive circuit in different using situations, the identification circuit displays a correct indicator number corresponding to a working state of the hard disk according to the using situation of the storage device backplane.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
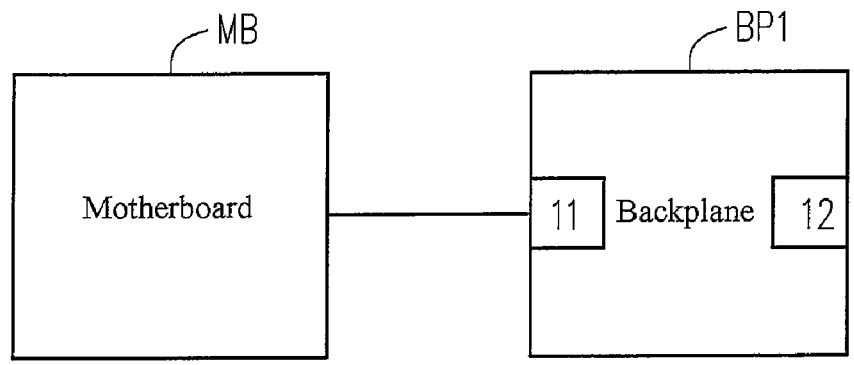
FIGS. 1 to 3 are block diagrams of a connection between a storage device backplane and a motherboard according to the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
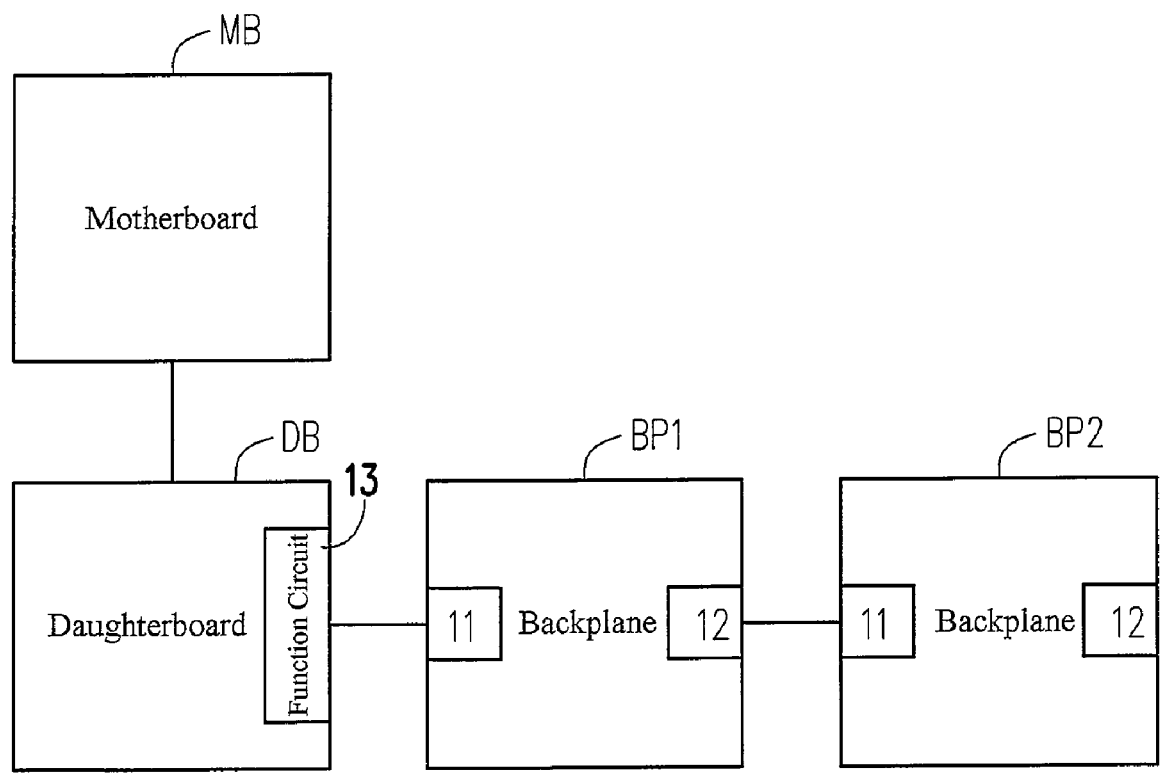
Figure 3:
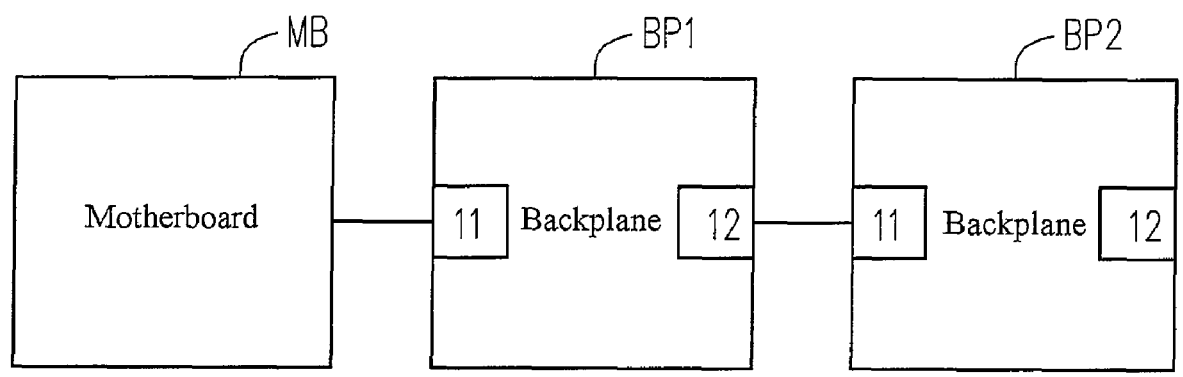

In order to avoid the high inventory cost and management cost caused by producing backplanes with different structures, the present invention is directed to a storage device backplane, which is capable of being applied in various combinations. FIGS. 1 to 3 are block diagrams of a connection between a storage device backplane and a motherboard according to the present invention. Taking an embodiment of FIG. 1 as an example, a storage device backplane BP possesses a first connection interface 11 and a second connection interface 12. The backplane BP1 may be coupled to a motherboard MB. Taking an embodiment of FIG. 2 for an example, the storage device backplane BP1 and BP2 respectively possesses the first connection interface 11 and the second connection interface 12, the backplane BP1 and the backplane BP2 possess the same storage device backplane structure. The backplanes BP1 and BP2 may be coupled to a daughterboard DB of the motherboard MB, in which the backplane BP1 is not directly connected to the motherboard MB. Taking an embodiment of FIG. 3 as an example, the storage device backplanes BP1 and BP2 respectively possesses the first connection interface 11 and the second connection interface 12, the backplane BP1 and the backplane BP2 possess the same storage device backplane structure, and they may be coupled to the motherboard MB. It should be noted that, when the storage device backplane of the present invention is used as the backplane BP2 cascaded to the backplane BP1, the first connection interface 11 of the backplane BP2 is coupled to the second connection interface 12 of the backplane BP1.

For example, taking FIG. 1 or FIG. 3 as an example, when the first connection interface 11 of the backplane BP1 is coupled to the motherboard MB, the backplane BP1 receives a first control signal (not shown) of the motherboard MB. Taking FIG. 2 as an example, when the first connection interface of the backplane BP1 is coupled to the daughterboard DB, the backplane BP1 receives a second control signal (not shown) of the motherboard MB. A logic level of the first control signal and a logic level of the second control signal may be mutually inverted.

In the above embodiment, the first and second control signals may be control signals sent by a south bridge controller (not shown) on the motherboard MB. The south bridge controller may be an enterprise southbridge 2 (ESB2) controller. Among the control signals sent by the ESB2 controller, a control signal at a logic high level may serve as the first control signal, and a control signal at a logic low level may serve as the second control signal. If the motherboard MB has the ESB2 controller, for example, as shown in FIGS. 1 and 3, the ESB2 controller on the motherboard MB may send the control signal at the logic high level to control the backplanes BP1 and BP2; for example, as shown in FIG. 2, the ESB2 controller on the motherboard MB may send the control signal at the logic low level to the backplanes BP1 and BP2.

It should be noted that, the first connection interface of the storage device backplane may be designed in such a way that when the first connection interface 11 of the backplane BP1 is coupled to the motherboard MB or the daughterboard DB, the first connection interface 11 of the backplane BP1 generates a corresponding first identification signal (not shown), and if the cascaded backplane BP2 exists, the first connection interface of the backplane BP2 further generates a corresponding second identification signal (not shown). In order to distinguish the first identification signal from the second identification signal, it may be designed in the following manner. When the first connection interface 11 of the backplane BP1 is coupled to the motherboard MB, the first identification signal is at the logic low level, and the second identification signal is at the logic high level; and when the first connection interface 11 of the backplane BP1 is coupled to the daughterboard DB, the first identification signal is at the logic high level, and the second identification signal is at the logic high level. Therefore, under a precondition that the backplane is confirmed to be connected to the motherboard, according to the logic level of the first identification signal, it can be differentiated whether the current backplane is the first backplane connected to the motherboard or the cascaded second backplane. If it is detected that the first identification signal is at the logic low level, it can be identified that the current backplane is the first backplane directly connected to the motherboard, and if it is detected that the second identification signal is at the logic high level, it can be identified that the current backplane is the cascaded second backplane.

It is assumed that the second connection interface 12 of the backplane BP1 may generate a third identification signal (not shown); if the cascaded backplane BP2 exists, the second connection interface 12 of the backplane BP2 may generate a corresponding fourth identification signal (not shown). It can be identified whether the backplane BP1 is cascaded to the backplane BP2 or not, and whether the backplane BP1 is the unique storage device backplane or not, according to the third and fourth identification signals. The second connection interface 12 of each backplane may be designed in such a way that, if the backplane BP1 is not cascaded to a backplane, the third identification signal is at the logic low level, and if the backplane BP1 is cascaded to a backplane, the third identification signal is at the logic high level, and the fourth identification signal is at the logic low level. Therefore, under the precondition that the backplane is confirmed to be the first backplane directly connected to the motherboard, it can be differentiated whether the current backplane is the unique first backplane or the cascaded second backplane according to the logic level of the third identification signal. If it is detected that the third identification signal is at the logic high level, it is identified that the cascaded second backplane exists; and if it is detected that the third identification signal is at the logic low level, it represents that only one backplane exists.

Definitely, the above exemplified design manner about the logic level of the identification signal can be opposite, and those skilled in the art can design different various manners according to an appropriate logic deduction, so the present invention is not limited to this embodiment.

The storage device backplane of the present invention may at least have the following using situations.

In a first using situation, as shown in FIG. 1, only one storage device backplane exists and is directly coupled to the motherboard.

In a second using situation, as shown in FIG. 2, two storage device backplanes possessing the same structure exist and support the daughterboard DB of the motherboard MB, one of the two storage device backplanes is used as the backplane BP1, the other one is used as second backplane BP2, the backplane BP1 is coupled to the daughterboard DB, and the second backplane BP2 is cascaded to the backplane BP1.

In a third using situation, as shown in FIG. 2, two storage device backplanes exist and support a south bridge controller of the motherboard MB, one of the two storage device backplanes is used as the backplane BP1, the other one is used as the backplane BP2, the backplane BP1 is coupled to the motherboard MB, and the backplane BP2 is cascaded to the backplane BP1.

In the first using situation, the storage device backplane can support at most 5 hard disks. In the second using situation, the daughterboard DB may have a function circuit 13, and the backplanes BP1 and BP2 are connected to PCI high-speed interfaces on the motherboard MB through the function circuit 13. The backplane BP1 can support at most 4 or 8 hard disks, and the backplane BP2 can support at most 4 or 8 hard disks. In the third using situation, the backplanes BP1 and BP2 are controlled by the south bridge controller on the motherboard MB, the backplane BP1 can support at most 4 hard disks, and the backplane BP2 can support at most 2 hard disks.

Figure 4:
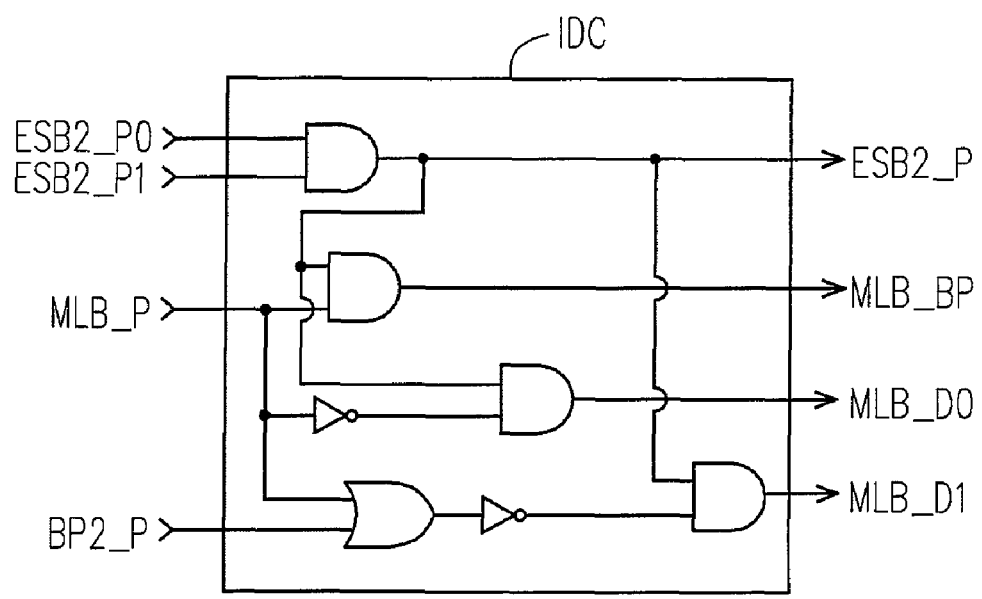
FIG. 4 is a detailed circuit diagram of an identification circuit according to the present invention.

Since the storage device backplanes with the same structure are used, in order to more easily identify different using situations automatically, the applicant finishes an identification circuit according to the above exemplified using situations. Definitely, the technicians in this field may make various adding and deleting designs according to the identification circuit of the present invention. Referring to FIG. 4, it is a detailed circuit diagram of an identification circuit according to the present invention. The identification circuit IDC receives a first control signal ESB2_P0 and a second control signal ESB2_P1 from the south bridge controller of the motherboard that are respectively used for controlling the first storage device backplane and the second storage device backplane. The identification circuit IDC also receives a first identification signal MLB_P from the first storage device backplane (and a second identification signal from the second storage device backplane), and receives a third identification signal BP2_P from the first storage device backplane (and a fourth identification signal from the second storage device backplane). The identification circuit IDC differentiates the using situations of the storage device backplane according to the first control signal ESB2_P0, the second control signal ESB2_P1, the first identification signal MLB_P, and the third identification signal BP2_P.

At least the following determining mechanisms exist through using the above signals.

It may be differentiated whether the backplane is coupled to the motherboard or to the daughterboard, according to the first control signal ESB2_P0 and the second control signal ESB2_P1.

Under the precondition that the backplane is coupled to the motherboard, according to the first identification signal MLB_P, it can be differentiated whether the backplane is the first backplane directly connected to the motherboard or the cascaded second backplane.

Under the precondition that the backplane is confirmed to be the first backplane directly connected to the motherboard, according to the third identification signal BP2_P, it can be differentiated whether the backplane is the unique backplane in the configuration, or another backplane is further cascaded.

The above determining mechanisms may be further designed according to the logic level of the signal, for example, when one of the first control signal ESB2_P0 and the second control signal ESB2_P1 is at the logic low level, it indicates that the backplane is coupled to the daughterboard. When both the first control signal ESB2_P0 and the second control signal ESB2_P1 are at the logic high level, it indicates that the backplane is coupled to the motherboard. When the first identification signal MLB_P is at the logic low level, it indicates that the backplane is the first backplane directly coupled to the motherboard. When the first identification signal MLB_P is at the logic high level, it indicates that the backplane is the cascaded second backplane, which may be connected to at most 2 hard disks. When the third identification signal BP2_P is at the logic low level, it indicates that only one backplane exist, which may be connected to at most 5 hard disks. When the third identification signal BP2_P is at the logic high level, it indicates that the backplanes is further cascaded to the second backplane, and the backplane may be connected to at most 4 hard disks. Therefore, a truth table is shown in Table 1 below.

TABLE 1

| Identification of Using Situations of Backplane | Truth Table | | |
|---|---|---|---|
| | First Determining Signal ESB2_P | First Identification Signal MLB_P | Third Identification Signal BP2_P |
| The backplane is coupled to the daughterboard. | 0 | X | X |
| Only one backplane exists, and the backplane may be connected to at most 5 hard disks. | 1 | 0 | 0 |

TABLE 1-continued

| Identification of Using Situations of Backplane | Truth Table | | |
|---|---|---|---|
| | First Determining Signal ESB2_P | First Identification Signal MLB_P | Third Identification Signal BP2_P |
| The backplane is further cascaded to the second backplane, and may be connected to at most 4 hard disks. | | 0 | 1 |
| The backplane is the cascaded second backplane, and may be connected to at most 2 hard disks. | | 1 | X |

According to the truth table of Table 1, the identification circuit IDC may be designed as follows.

The identification circuit IDC receives a signal from the backplane, and generates a first determining signal ESB2_P according to the first control signal ESB2_P0 and the second control signal ESB2_P1. According to the first determining signal ESB2_P, if the determining result is at the logic low level, it belongs to the second using situation; and if the determining result is at the logic high level, it belongs to one of the first and third using situations.

If the determining result is one of the first and third using situations, the identification circuit IDC continuously generates a second determining signal MLB_BP according to the first determining signal ESB2_P and the first identification signal MLB_P, for determining whether the storage device backplane is the first backplane or not. If the determining result is at the logic low level, the storage device backplane is the first backplane; if the determining result is at the logic high level, the storage device backplane is the cascaded second backplane.

When it is determined that the storage device backplane is the first backplane, the identification circuit IDC generates a third determining signal MLB_D1 according to the first determining signal ESB2_P and the third identification signal BP2_P, for determining whether the storage device backplane is the unique backplane or not. If the determining result is at the logic low level, it belongs to the first using situation, and only one backplane is used. If the determining result is at the logic high level, it belongs to the third using situation.

When the determining result is one of the first or third using situations, the identification circuit IDC generates a fourth determining signal MLB_D0 according to the first identification signal MLB_P, for determining whether the storage device backplane is the first backplane directly coupled to the motherboard. If the determining result is at the logic low level, it indicates that the backplane is the first backplane directly coupled to the motherboard. If the determining result is at the logic high level, it indicates that the backplane is the cascaded second backplane.

The technicians in this field should know that, there is more than one design manner of the identification circuit IDC of FIG. 4, and other logic circuits may also be used to finish the function of the circuit, so that the present invention is not limited to the embodiment.

In another embodiment, the identification circuit IDC further includes an LED drive circuit (not shown). Through using the LED drive circuit in different using situations, the identification circuit displays a correct indicator number corresponding to the working state of the hard disk according to the using situation of the storage device backplane.

To sum up, the advantages of the storage device backplane in the embodiments of the present invention lie in that, the manufacturer can produce backplanes with the same structure, and thus reducing the inventory cost and management cost. In addition, the identification circuit used together with the storage device backplane can automatically identify the using situation of the storage device backplane, and can display the correct indicator number corresponding to the working state of the hard disk according to different using situations.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A storage device backplane, possessing a first connection interface and a second connection interface, applicable for being used as a first backplane supporting a daughterboard of a motherboard, or as a second backplane cascaded to the first backplane, wherein the first backplane and the second backplane possess the same storage device backplane structure, and if the storage device backplane is used as the first backplane, a first connection interface of the first backplane is coupled to the daughterboard of the motherboard; if the storage device backplane is used as the second backplane, a first connection interface of the second backplane is coupled to a second connection interface of the first backplane, wherein when the first connection interface of the first backplane is coupled to the daughterboard, the first backplane receives a control signal of the motherboard, and when the first connection interface of the first backplane is coupled to the daughterboard and the first connection interface of the second backplane is coupled to the second connection interface of the first backplane, the second backplane receives the control signal.

2. The storage device backplane according to claim 1, wherein the storage device backplane at least comprises the following using situation:
in a using situation, two storage device backplanes exist and support the daughterboard of the motherboard, one of the two storage device backplanes is used as the first backplane, the other one is used as the second backplane, the first backplane is coupled to the daughterboard, and the second backplane is cascaded to the first backplane.

3. The storage device backplane according to claim 2, wherein in the using situation, the first and second backplanes are connected to PCI high-speed interfaces on the motherboard through the daughterboard, the first backplane supports at most 4 or 8 hard disks, and second backplane supports at most 4 or 8 hard disks.

4. The storage device backplane according to claim 2, wherein in the using situation, the daughterboard comprises a function circuit, and the first and second backplanes are connected to the PCI high-speed interfaces on the motherboard through the function circuit.

5. An identification circuit, coupled to a storage device backplane, wherein at least one storage device backplane exists and possesses a first connection interface and a second connection interface and applicable for being used as a first backplane supporting a daughterboard of the motherboard, or as a second backplane cascaded to the first backplane; the first backplane and the second backplane possess the same storage device backplane structure; if the storage device backplane is used as the first backplane, a first connection interface of the first backplane is coupled to the daughterboard of the motherboard, and if the storage device backplane is used as the second backplane, a first connection interface of the second backplane is coupled to a second connection interface of the first backplane; and the identification circuit identifies a using situation of the storage device backplane according to a signal changes on the storage device backplane, wherein when the first connection interface of the first backplane is coupled to the daughterboard, the first backplane receives a control signal of the motherboard, and the identification circuit identifies whether the first backplane is directly connected to the motherboard or not according to the control signal.

6. The identification circuit according to claim 5, wherein the identification circuit identifies that the storage device backplane at least comprises the following using situations:
in a using situation, two storage device backplanes exist and support the daughterboard of the motherboard, one of the two storage device backplanes is used as the first backplane, the other one is used as the second backplane, the first backplane is coupled to the daughterboard, and the second backplane is cascaded to the first backplane.

7. The identification circuit according to claim 6, wherein in the using situation, the first and second backplanes are connected to PCI high-speed interfaces on the motherboard through the daughterboard, the first backplane supports at most 4 or 8 hard disks, and second backplane supports at most 4 or 8 hard disks.

8. The identification circuit according to claim 6, wherein in the using situation, the daughterboard comprises a function circuit, and the first and second backplanes are connected to the PCI high-speed interfaces on the motherboard through the function circuit.

9. The identification circuit according to claim 5, further comprising an LED drive circuit, wherein through using the LED drive circuit in different using situations, the identification circuit displays a correct indicator number corresponding to a working state of the hard disk according to the using situation of the storage device backplane.

* * * * *